(12) United States Patent
Kale (10) Patent No.: US 12,487,015 B2
(45) Date of Patent: Dec. 2, 2025

(54) SEMICONDUCTOR WAFER TEMPERATURE CONTROL APPARATUS

(71) Applicant: Edwards Vacuum LLC, Sanborn, NY (US)

(72) Inventor: Kaustubh Kale, Chelmsford, MA (US)

(73) Assignee: Edwards Vacuum LLC, Sanborn, NY (US)

( * ) Notice: Subject to any disclaimer, the term of this patent is extended or adjusted under 35 U.S.C. 154(b) by 410 days.

(21) Appl. No.: 17/760,500

(22) PCT Filed: Feb. 10, 2021

(86) PCT No.: PCT/IB2021/051070
§ 371 (c)(1),
(2) Date: Aug. 10, 2022

(87) PCT Pub. No.: WO2021/161183
PCT Pub. Date: Aug. 19, 2021

(65) Prior Publication Data
US 2023/0056446 A1    Feb. 23, 2023

(30) Foreign Application Priority Data

Feb. 12, 2020 (GB) ...................... 2001895

(51) Int. Cl.
*F25B 49/02* (2006.01)
*F25B 9/00* (2006.01)
*F25B 41/20* (2021.01)

(52) U.S. Cl.
CPC .............. *F25B 49/02* (2013.01); *F25B 9/006* (2013.01); *F25B 41/20* (2021.01); *F25B 2600/2515* (2013.01); *F25B 2700/2103* (2013.01)

(58) Field of Classification Search
CPC .... F25B 7/00; F25B 9/006; F25B 9/02; F25B 41/20; F25B 49/02; F25B 2600/2515;
(Continued)

(56) References Cited

U.S. PATENT DOCUMENTS

2006/0075775 A1    4/2006  Boiarski et al.
2006/0130503 A1    6/2006  Flynn et al.
(Continued)

FOREIGN PATENT DOCUMENTS

CN    1380965 A    * 11/2002    ............ F25B 47/022
CN    1492987 A      4/2004
(Continued)

OTHER PUBLICATIONS

Chinese Office Action dated Jun. 19, 2023 and Search Report dated Jun. 16, 2023 for corresponding Chinese application Serial No. 2021800145013, 22 pages.
(Continued)

*Primary Examiner* — Joseph F Trpisovsky
(74) *Attorney, Agent, or Firm* — Theodore M. Magee; Westman, Champlin & Koehler, P.A.

(57) ABSTRACT

A temperature control apparatus for supplying fluid to control a temperature of at least one semiconductor wafer within a semiconductor processing chamber, the temperature control apparatus comprising: a mixed refrigerant refrigeration system; the temperature control apparatus being configured to supply the mixed refrigerant to at least one conditioning circuit within the semiconductor processing chamber and to receive the mixed refrigerant from the at least one conditioning circuit. The temperature control apparatus comprises a temperature control circuitry for controlling a temperature of the at least one conditioning circuit to one of a plurality of predetermined temperatures, at least one of the temperatures being below −100° C., the temperature
(Continued)

control circuitry being configured to control the temperature of the at least one conditioning circuit by controlling at least one of a mass flow rate, composition or temperature of the mixed refrigerant supplied to the at least one conditioning circuit.

14 Claims, 3 Drawing Sheets

(58) Field of Classification Search
CPC .... F25B 2700/2103; F25B 2700/21174; F25B 2700/21175
See application file for complete search history.

(56) References Cited

U.S. PATENT DOCUMENTS

| | | |
|---|---|---|
| 2006/0168976 A1 | 8/2006 | Flynn et al. |
| 2007/0095097 A1 | 5/2007 | Cowans et al. |

FOREIGN PATENT DOCUMENTS

| | | | |
|---|---|---|---|
| CN | 1575401 A | 2/2005 | |
| CN | 101084409 A | 12/2007 | |
| EP | 1438539 A | 7/2004 | |
| EP | 2351976 A1 | 8/2011 | |
| EP | 2818530 A2 | 12/2014 | |
| KR | 101373766 B1 | 3/2014 | |
| KR | 101829909 B1 | 2/2018 | |
| TW | I635563 B | 9/2018 | |
| WO | 03036197 A1 | 5/2003 | |
| WO | WO-2007092204 A2 * | 8/2007 | ............ F25B 47/006 |

OTHER PUBLICATIONS

Chinese Office Action dated Mar. 29, 2024 and Search Report dated Mar. 27, 2024 for corresponding Chinese application Serial No. 2021800145013, 32 pages.
Yan, Qi-sen, "Refrigeration Technology and its Applications," 3 pages, China Construction Industry Press, Jun. 2006.
Notification of Transmittal of the International Search Report and the Written Opinion of the International Searching Authority, or the Declaration, PCT International Search Report and PCT Written Opinion dated Apr. 23, 2021 for corresponding PCT application Serial No. PCT/IB2021/051070, 13 pages.
British Search Report dated Oct. 28, 20 for corresponding British application Serial No. GB2001895.8, 2 pages.
Response to Demand dated Aug. 27, 2021 for corresponding PCT application Serial No. PCT/IB2021/051070, 4 pages.
PCT Notification of Transmittal of International Preliminary Report on Patentability dated May 6, 2022 for corresponding PCT application Serial No. PCT/IB2021/051070, 10 pages.
Taiwanese Office Action and Search Report dated Oct. 8, 2024 for corresponding Taiwanese application Serial No. 110105051, 10 pages.

* cited by examiner

SEMICONDUCTOR WAFER TEMPERATURE CONTROL APPARATUS

CROSS-REFERENCE TO RELATED APPLICATION

This application is a Section 371 National Stage Application of International Application No. PCT/IB2021/051070, filed Feb. 10, 2021, and published as WO 2021/161183 A1 on Aug. 19, 2021, the content of which is hereby incorporated by reference in its entirety and which claims priority of British Application No. 2001895.8, filed Feb. 12, 2020.

FIELD

The field of the invention relates to semiconductor wafer temperature control apparatus.

BACKGROUND

In conventional semiconductor processing schemes, the semiconductor wafer is heated or cooled using a heat transfer fluid. This heat transfer fluid is in turn cooled/heated using a refrigeration chiller. While this has some advantages it also has several drawbacks in terms of low energy efficiency, losses associated with multiple heat transfer steps, the large footprint of the equipment and associated capital and recurring costs.

Furthermore, the next generation semiconductor device fabrication processes such as (but not limited to) cryogenic etch and deposition require colder temperatures than is currently the case. These temperatures are problematic for many of the conventional heat transfer fluids used. In particular, their viscosity, conductivity and specific heat deteriorate as the fluid temperature approaches the −80 to −90 C range. Next generation processes require chuck/wafer temperatures as low as −180 C. Although there are some heat transfer fluids that can function down to temperatures in the −110 C to −115 C range these fluids are highly flammable. Use of flammable fluids is a safety risk and necessitates extra design measures to mitigate this risk, adding to the overall cost and complexity of the system. A further problem associated with conventional semiconductor chillers is the fact that the thermodynamic cycle used to produce cooling in these chillers is generally highly inefficient below about −90 C. Even to achieve −90 C temperatures, multiple systems (with 1 compressor each) are required in series (cascade refrigeration), which is an inefficient arrangement from an energy and sub-fab space requirement point of view.

One potential solution that is used in the laboratory would be to use liquid nitrogen (LN2) which has a boiling temperature of about −196 C which is cold enough for most new process applications. However, although liquid nitrogen is convenient for use in the laboratory, its use is impractical for any kind of commercial operation as it is a very costly recurring expense.

It would be desirable to provide a cost effective semiconductor wafer temperature control apparatus able to cool to the lower temperatures required in next generation processing apparatus.

The discussion above is merely provided for general background information and is not intended to be used as an aid in determining the scope of the claimed subject matter. The claimed subject matter is not limited to implementations that solve any or all disadvantages noted in the background.

SUMMARY

A first aspect provides temperature control apparatus for supplying fluid to control a temperature of at least one semiconductor wafer within a semiconductor processing chamber, said temperature control apparatus comprising: a mixed refrigerant refrigeration system; said temperature control apparatus being configured to supply said mixed refrigerant to at least one conditioning circuit within said semiconductor processing chamber and to receive said mixed refrigerant from said at least one conditioning circuit; wherein said temperature control apparatus comprises temperature control circuitry for controlling a temperature of said at least one conditioning circuit to one of a plurality of predetermined temperatures, at least one of said temperatures being below −100° C.: said temperature control circuitry being configured to receive a signal indicative of a temperature of said at least one conditioning circuit from at least one temperature sensor and to control said temperature of said at least one conditioning circuit in dependence upon said received signal and said predetermined temperature by controlling at least one of a mass flow rate, composition or temperature of said mixed refrigerant supplied to said at least one conditioning circuit.

The present invention proposes a temperature control apparatus that rather than using a secondary conditioning fluid for cooling a semiconductor wafer, supplies the mixed refrigerant of a mixed refrigerant refrigeration system to the conditioning circuit to cool or warm the wafer. In this way the challenges associated with using a secondary fluid do not arise, and the problems associated with the energy and efficiency losses and additional footprint required for such a secondary system are also addressed.

The refrigeration system is one that uses a mixed refrigerant, that is a refrigerant having a mixture of different refrigerants with different boiling points. At least some of these refrigerants have a boiling point at the operational cooling temperatures and pressures of the refrigeration system. The advantages of using this type of refrigeration system is that as the refrigerant comprises different refrigerants at least some of which are in 2-phase equilibrium, the refrigerant is able not only to provide effective cooling using the latent heat of evaporation but also to maintain a substantially steady temperature while doing so. In some embodiments, the refrigeration system is a Joule Thompson refrigeration system based on the Auto-Cascade refrigeration cycle. Such refrigeration systems are capable of achieving temperatures as low as −180 C with excellent energy efficiency and with a very compact footprint. Contrary to cascade refrigeration chillers, these refrigeration systems use only one compressor to achieve these very low temperatures. These refrigeration systems also have a significantly smaller number of overall components, especially components having moving parts which results in a more compact footprint and much longer times between pump maintenance.

The temperature control apparatus has feedback control in that signals from a temperature sensor are used by the control circuitry in its control of the temperature, the control circuitry adjusting at least one of a mass flow rate, composition or temperature of said mixed refrigerant supplied to said at least one conditioning circuit in response to the sensed temperature indicating the temperature deviating from the desired predetermined temperature.

In some embodiments the at least one temperature sensor is located on or close to the conditioning circuit and is not part of the temperature control apparatus, the temperature control circuitry receiving the signal(s) from the sensor, either wirelessly or via a wired connection. In other embodiments, the temperature control apparatus comprises said at least one temperature sensor; and said temperature control circuitry is configured to control said temperature of said at least one conditioning circuitry by controlling a mass flow rate, composition or temperature of said mixed refrigerant supplied to said at least one conditioning circuit.

In some embodiments, said temperature control circuitry is configured to control a temperature of said at least one conditioning circuit to one of a plurality of predetermined temperatures between 150° C. and −180° C., at least one of said predetermined temperatures being below −100° C.

Next generation semiconductor processes require increased temperature ranges which may be between 1500 C and −180° C. Embodiments are able to provide conditioning fluid in the form of the mixed refrigerant cooled within such a temperature range using the temperature control apparatus of an embodiment. In this regard, although the system is generally configured to cool the semiconductor wafer, it is also configured in some embodiments to output warmed refrigerant to provide heating to the wafer processing apparatus.

In some embodiments, said apparatus is configured to supply said mixed refrigerant to a plurality of conditioning circuits for cooling or conditioning a plurality of semiconductor wafer, said plurality of conditioning circuits being arranged in parallel with each other, said temperature control apparatus being configured to circulate said mixed refrigerant through selected ones of said plurality of conditioning circuits during a processing cycle.

Although, the temperature control apparatus may be configured to cool a single wafer within one semiconductor processing chamber, in some embodiments it is configured to supply mixed refrigerant to cool a plurality of wafers arranged in parallel. In this way, the apparatus can effectively control the temperature in a number of semiconductor processing chambers within a semiconductor fab. In this regard as the conditioning circuit is cooled directly by the supply of mixed refrigerant, different temperatures may be attained from a single refrigeration system by suitable control of the mass flow rate, temperature or composition of the mixed refrigerant supplied.

In some embodiments, said temperature control circuitry is configured to individually control a temperature of said plurality of conditioning circuits by controlling at least one of a mass flow rate, temperature or composition of said mixed refrigerant supplied to each of said plurality of conditioning circuits.

Although, the temperature control apparatus may send the same refrigerant to each of the conditioning circuits, in some embodiments it is configured to individually control a mass flow rate, temperature or composition of the refrigerant that is sent to each of the selected plurality of conditioning circuits that are currently being processed. In this way, the temperature control apparatus can be used to control the temperature within a number of processing chambers that may be at different stages within the processing cycle independently.

In some embodiments, said temperature control circuitry is configured to receive signals indicative of a temperature of each said plurality of conditioning circuits from a plurality of temperature sensors and to control said temperature of said plurality of conditioning circuits in dependence upon said received signals and said predetermined temperatures by controlling at least one of a mass flow rate, composition or temperature of said mixed refrigerant supplied to each of said plurality of conditioning circuits.

In some embodiments, the temperature control apparatus comprises a bypass mixed refrigerant channel for channelling a portion of said mixed refrigerant output from said compressor around at least a portion of said refrigeration system such that mixed refrigerant in said bypass channel is warmer than mixed refrigerant output by said refrigeration system; wherein said temperature control circuitry is configured to control a temperature of said mixed refrigerant output to each of said selected ones of said plurality of conditioning circuits by controlling a proportion of said mixed refrigerant from said bypass channel and said mixed refrigerant output from said refrigeration system that is supplied to said wafer conditioning circuit.

One way of controlling the temperature of the refrigerant sent to each of the conditioning circuits is to channel some of the mixed refrigerant that is output from the compressor towards the conditioning circuits, such that either the warmed mixed refrigerant or the cooled mixed refrigerant that has gone through the refrigeration system or a mixture of both can be provided to each of the conditioning circuits. Although, in this embodiment the warmed refrigerant may be mixed with the cooled refrigerant to achieve the desired temperature, in other embodiments the warmed refrigerant may be used in a heat exchanger to warm the cooled refrigerant prior to it entering the conditioning circuit at the desired temperature.

In some embodiments, the temperature control provided by mixing the mixed refrigerant from the compressor and the mixed refrigerant from the refrigeration system may be used to provide gross temperature control, with finer temperature control being provided by other of the temperature control mechanisms, such as mass flow rate control of the mixed refrigerant.

In some embodiments, said temperature control apparatus comprises: at least one valve for controlling a flow of refrigerant into said at least one conditioning circuit.

One relatively simple way of controlling the temperature within the conditioning circuit is to control a flow of refrigerant into the conditioning circuit using a valve.

In some embodiments, said at least one valve comprises at least one of: an on/off valve and a proportional control valve.

The valves used to control the flow of mixed refrigerant may be a simple on/off valve and/or a proportional control valve. In either case it may be advantageous if rapid cycle or quick reaction valves are used to provide the required reaction times and sensitivity. The on/off valve may be a fast cycle solenoid valve. The proportional control valve may be a servo or stepper motor actuated valve.

In some embodiments, said temperature control apparatus comprises: a composition control device for changing a composition of the mixed refrigerant prior to said mixed refrigerant entering said at least one conditioning circuit.

As the refrigerant is a mixed refrigerant comprising different compounds, the compounds being in different phases, one way of regulating the temperature of such mixed refrigerant may be to regulate the composition and phase of the refrigerant as it enters the conditioning circuit.

In some embodiments, said composition control device comprises: a phase separator, said composition of said mixed refrigerant being controlled by controlling at least one of a mass flow rate and subsequent expansion of the liquid phase refrigerants exiting the phase separator.

As the mixed refrigerant is formed of refrigerants with different boiling points, a phase separator can be used to remove at least some of the lower boiling point refrigerants from the mixture and in this way the composition of the mixed refrigerant is changed. By controlling the amount of lower boiling point refrigerants that are separated out the composition of the mixed refrigerant can be controlled and thereby the temperature control provided by the mixed refrigerant.

The temperature and the cooling capacity of the mixed refrigerant will depend on the ratio of gas to liquid phases of the refrigerants within the mixed refrigerant stream and thus, one way of controlling the temperature can be to control the phase composition of the mixed refrigerant. This may be done by using an expansion device for example.

In some embodiments, said temperature control apparatus comprises: an evaporator pressure regulator for controlling the pressure of the mixed refrigerant at the at least one conditioning circuit.

In some cases an evaporator pressure regulator which could be in the form of an expansion valve to control the pressure of the mixed refrigerant at the conditioning circuit and in this way its temperature.

In some embodiments, said temperature control apparatus comprises: a heat exchanger through which at least a portion of said mixed refrigerant flows, said heat exchanger being configured to receive a controlled flow of at least one warmer fluid.

One way of controlling the temperature of the mixed refrigerant is by use of a heat exchanger. The heat exchanger may have a flow of higher temperature fluid which may be fluid from another part of the refrigeration system, such as from the compressor, or from one of the phase separators, or it may be a fluid process that is at a warmer temperature. Flow control valves can be used to control the flow of both fluids and thus, the temperature of the refrigerant. The heat exchanger may be located prior to at least one conditioning circuit.

In some embodiments, said temperature control apparatus comprises: an expansion device for controlling an expansion of said mixed refrigerant and thus, a pressure of said mixed refrigerant within said at least one conditioning circuit.

A temperature of the mixed refrigerant may be controlled using an expansion device that controls the expansion of the mixed refrigerant prior to the mixed refrigerant entering the at least one conditioning circuit.

In some embodiments, said refrigeration system comprises at least one compressor, said temperature control circuitry comprising control circuitry for controlling a discharge mass flow rate of said at least one compressor.

Alternatively and/or additionally the temperature control circuitry may control the amount of refrigerant that is compressed and output by the compressor. This in turn will control the temperature of the refrigerant and may be an energy efficient way of providing this control.

In some embodiments, said refrigeration system comprises a plurality of compressors arranged in parallel, said temperature control circuitry comprising control circuitry for controlling a discharge mass flow rate of said plurality of compressors by controlling at least one of:
  a number of said plurality of compressors that are operational;
  a control speed of at least one of said plurality of compressors; and unloading at least one of said plurality of compressors.

In many systems the refrigeration system may have a number of compressors as this provides greater reliability and allows the system to be serviced without the need to shut it down. These compressors may be arranged in parallel and the temperature control apparatus can control the temperature using temperature control circuitry to control the discharge mass flow rate of one or more of these compressors. This can be done by controlling the number of the compressors that are operational and/or the speed of at least one of the compressors and/or at least partial unloading of at least one of the compressors. This again is an energy efficient way of reducing the output of the compressor.

A second aspect provides an apparatus comprising a semiconductor processing chamber comprising at least one conditioning circuit, and a temperature control apparatus according to a first aspect, said temperature control apparatus being arranged such that mixed refrigerant from said temperature control apparatus is supplied to said and flows through said at least one conditioning circuit.

A third aspect provides a method of controlling a temperature of at least one semiconductor wafer within a semiconductor processing chamber by controlling a temperature of at least one conditioning circuit within said semiconductor processing chamber to one of a plurality of predetermined temperatures, at least one of said temperatures being below $-100°$ C.; said method comprising: supplying a mixed refrigerant from a refrigeration system to said at least one conditioning circuit within said semiconductor processing chamber; and
  receiving said mixed refrigerant from said at least one conditioning circuit;
  receiving a signal indicative of a temperature of said at least one conditioning circuit from at least one temperature sensor and in dependence upon said received signal and said predetermined temperature controlling said temperature by controlling at least one of a mass flow rate, composition or temperature of said mixed refrigerant supplied to said at least one conditioning circuit.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing the embodiments in any more detail, first an overview will be provided.

Embodiments propose a refrigeration system that uses mixed refrigerants such as the Mixed Refrigerant Joule Thompson refrigeration systems based on the Auto-Cascade refrigeration cycle. Such refrigeration systems are capable of achieving temperatures as low as −180 C with excellent energy efficiency and a very compact footprint. Contrary to cascade refrigeration chillers, refrigeration systems use only one compressor to achieve very low temperatures. Refrigeration systems also have significantly smaller number of overall components, especially moving parts which results in a more compact footprint and much higher times between pump maintenance.

Embodiments describe an apparatus to condition (both heat and cool) a semiconductor wafer in some cases via a chuck in the −180 C to +150 C temperature range, without the need for a secondary heat transfer fluid (coolant). The wafer or chuck is conditioned by directly coupling it to a mixed refrigerant Joule Thompson refrigeration system which introduces the refrigerant mixture into the conditioning channels of the conditioning circuit which may be within the chuck. The refrigerant mixture can be a mixture of 2-5 refrigerants. Embodiments provide means for temperature control of the refrigerant.

Embodiments are suitable for next generation cryogenic etch and deposition processes required to fabricate HAR devices such as but not limited to MRAM and 3D-NAND.

Figure 1:
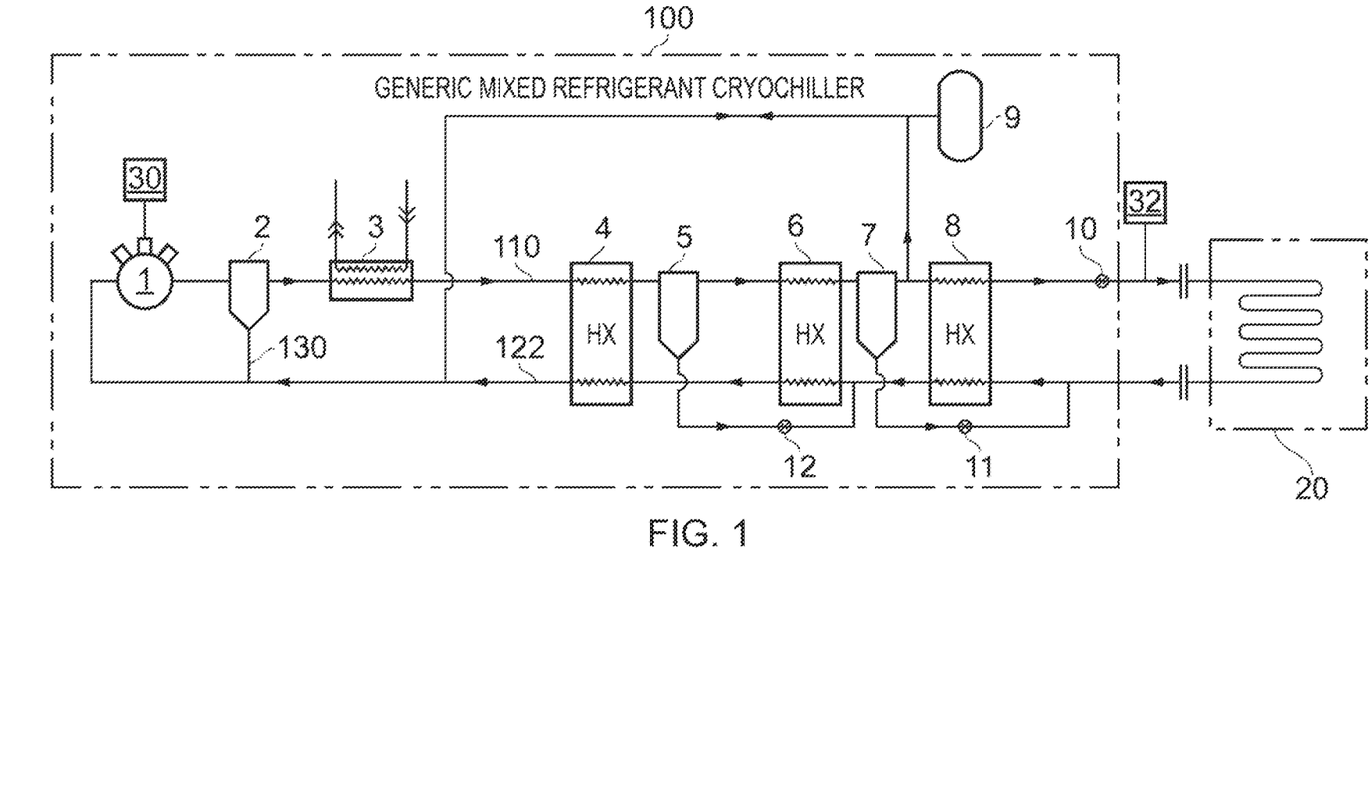
FIG. 1 shows a wafer temperature control apparatus according to an embodiment.

FIG. 1 shows a semiconductor wafer temperature control apparatus for cooling or warming a semiconductor wafer mounted on a semiconductor wafer chuck within a semiconductor vacuum processing chamber.

The semiconductor wafer temperature control apparatus comprises a temperature control apparatus 100 according to an embodiment connected to a conditioning circuit 20, which in this embodiment comprises channels within a wafer chuck. The temperature control apparatus 100 comprises a very low temperature refrigeration system that includes a compressor 1 for compressing the mixed refrigerant and an optional oil separator 2 a first outlet of which feeds condenser 3. A second outlet of oil separator 2 feeds back to compressor suction line 122 via an oil return line 130. Oil separator 2 is not needed if an oil free compressor is used.

The refrigeration system is an auto-refrigerating cascade system and further includes a heat exchanger 4, a phase separator 5, a heat exchanger 6, a phase separator 7, and a heat exchanger 8 and an expansion device in the form of a flow metering device (FMD) 10. The heat exchangers provide heat transfer from the higher pressure refrigerant to the lower pressure refrigerant. The FMD's throttle the higher pressure refrigerant to lower pressure and create a refrigeration effect as a result of the throttling process.

The supply refrigerant flow path through the refrigeration process is as follows: a supply inlet of heat exchanger 4 is fed by liquid line 110 and a supply outlet of heat exchanger 4 feeds a supply inlet of phase separator 5. A supply outlet of phase separator 5 feeds a supply inlet of heat exchanger 6 and a supply outlet of heat exchanger 6 feeds a supply inlet of phase separator 7. A supply outlet of phase separator 7 feeds a supply inlet of heat exchanger 8. A supply outlet of heat exchanger 8 feeds refrigerant supply line to the wafer conditioning circuit.

The return refrigerant flow path through the refrigeration process is as follows: a return inlet of heat exchanger 8 is fed by refrigerant return line from the wafer conditioning circuit 20 and a return outlet of heat exchanger 8 feeds a return inlet of heat exchanger 6. A return outlet of heat exchanger 6 feeds a return inlet of heat exchanger 4. A return outlet of heat exchanger 4 feeds suction line 122 to the compressor 1.

Additionally, a second outlet of phase separator 5 feeds FMD 12 which feeds into the refrigerant return path at a node between heat exchanger 6 and heat exchanger 8. A second outlet of phase separator 7 feeds FMD 11 which feeds into the refrigerant return path at a node between heat exchanger 8 and the wafer conditioning circuit 20 return line.

In each case phase separators 7 and 8, act to separate the liquid refrigerant from the vapor refrigerant. Separation efficiencies vary from 40% to 100% (that is anywhere from 60% to 0% of the liquid may exit through the first outlet). The first outlet is preferentially vapor. The second outlet to the return path is selectively liquid. The liquid from each phase separator is expanded by a throttling device, typically an expansion valve or capillary tube, identified as a flow metering device (FMD). Therefore the liquid is at high pressure when exiting phase separators 5 and 7 and at low pressure when mixed with returning low pressure refrigerant.

FIG. 1 also shows a temperature control circuitry 30 configured to control the temperature of the mixed refrigerant suppled to the semiconductor wafer circuit. In this embodiment the temperature control circuit receives signals from a temperature sensor 32 and controls the temperature by controlling one of the components in the refrigeration system 100.

In one embodiment temperature control circuitry 30 controls the compressor 1 to control the temperature of the mixed refrigerant that is sent to the conditioning circuit 20. Temperature control circuitry 30 may receive a signal from the refrigeration system's controller that indicates the temperature required in one or more processing chambers. In this embodiment the compressor 1 is a plurality of compressors arranged in parallel and temperature control circuitry 30 controls the number of compressors that are operational at any one time in dependence upon the temperature required by the processing chamber and in dependence on the temperature measured by temperature sensor 32 which transmits signals indicative of a measured temperature to the control circuitry 30. In other embodiments, control circuitry 32 may control the flow rate of the compressor(s) by controlling one of the loading or the speed of the of the compressor(s) 1.

Alternately and/or additionally temperature control may be provided by suitable control of flow control valve 12, which controls the flow and expansion of the liquid phase refrigerant from phase separator 5. By controlling the expansion of liquid out of the phase separator 5, composition and phase of the rest of mixed refrigerant can be controlled. Thereby providing the ability to control the thermo-physical properties of the mixed refrigerant being sent to the conditioning circuits 20.

In some embodiments, the semiconductor processing chamber housing the semiconductor wafer conditioning circuit may be remote from the refrigeration system and in such cases rather than having a temperature sensor monitoring the temperature of the mixed refrigerant supplied to the conditioning circuit, signals indicative of a temperature of the conditioning circuit may be received from the semiconductor chamber control circuitry which monitors the temperature of the wafer.

Figure 2:
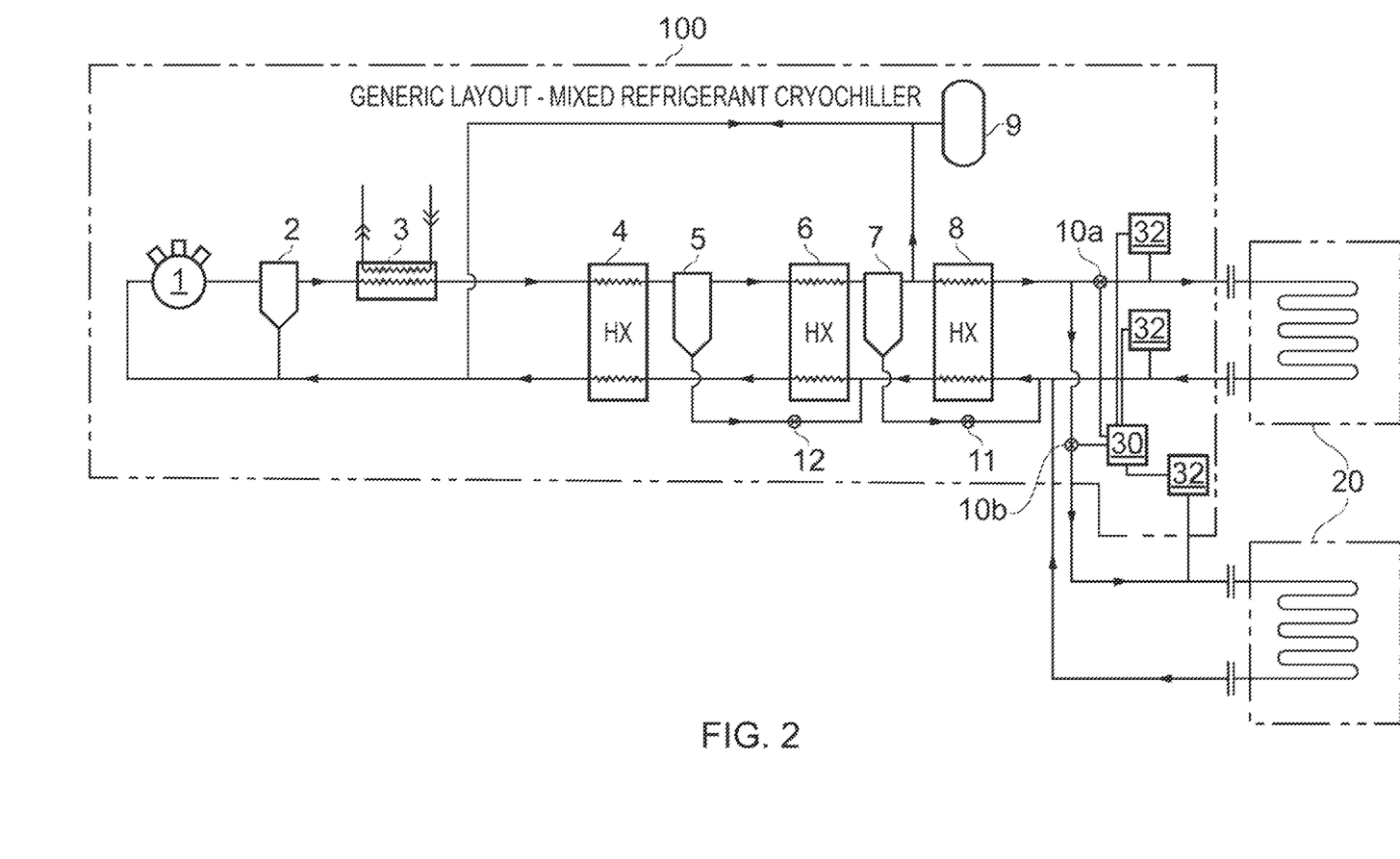
FIG. 2 shows an apparatus for controlling the temperature of a plurality of wafers according to an embodiment.

FIG. 2 shows an alternative embodiment, where the refrigeration system 100 supplies a plurality of conditioning circuits 20 for conditioning a plurality of semiconductor wafers. In this embodiment, the temperature control circuitry 30 controls the temperature of the refrigerant supplied to each conditioning circuit by controlling respective expansion devices 10a and 10b. In this embodiment, the expansion devices 10a and 10b are in the form of an electronic expansion valve and thus, control the temperature of the refrigerant.

Figure 3:
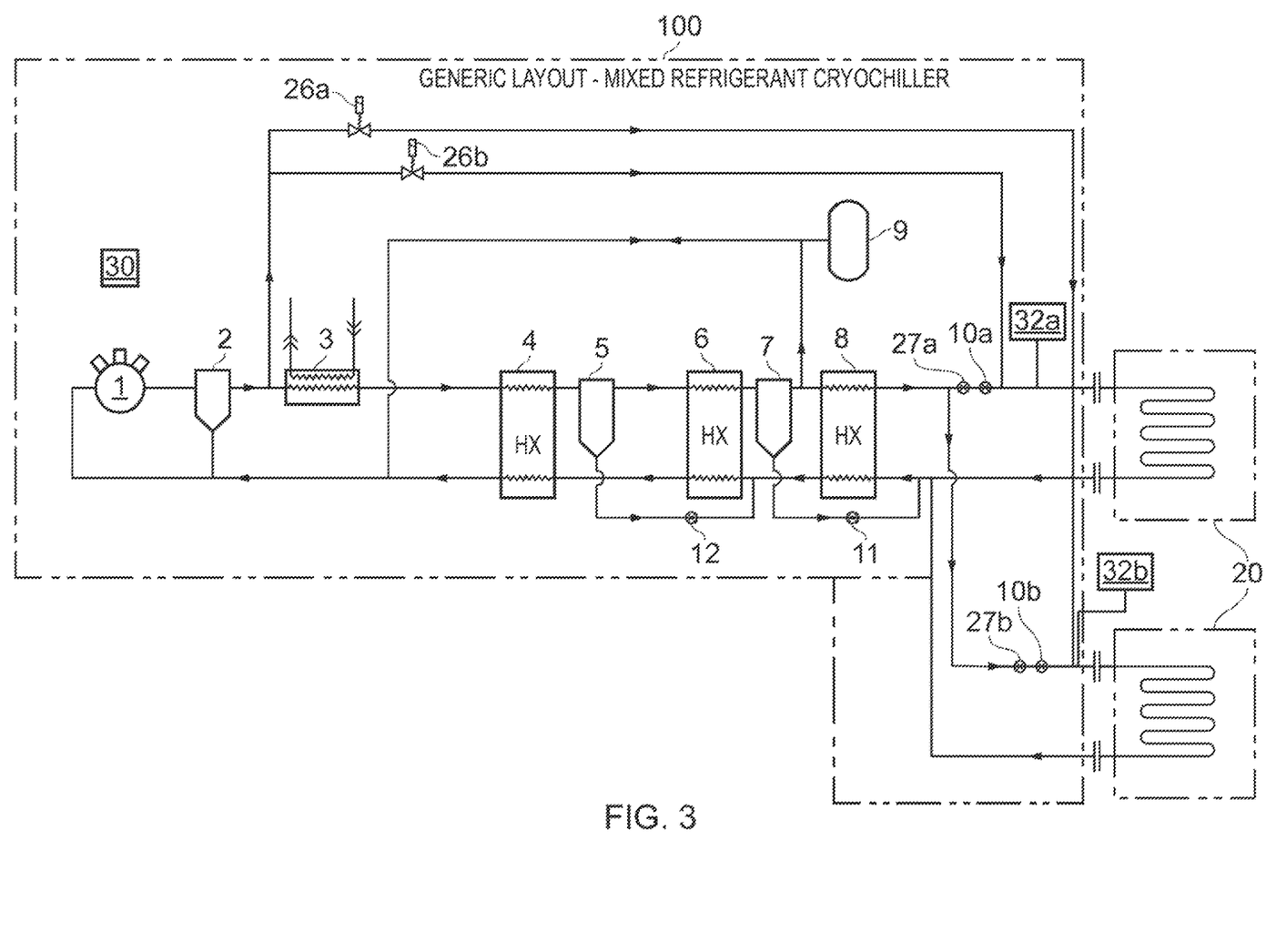
FIG. 3 shows a system for conditioning multiple semiconductor wafers at different temperatures according to an embodiment.

FIG. 3 shows an alternative embodiment where warmer gas output from compressor 1 is directed to an optional oil separator 2 and from there to one or more of three different channels. One channel directs flow through the auto-cascade refrigeration system such that the fluid is cooled, and the other two direct fluid towards each of the two conditioning circuits 20. The channels towards the conditioning circuits comprise valves 26a and 26b which control the flow. The flow in these channels flow towards the conditioning circuits and may join with cooled fluid from the refrigeration system prior to flowing into the conditioning circuits. It should be noted that although two conditioning circuits are shown there could be any number of conditioning circuits and corresponding gas flow channels.

As noted above, the refrigeration system cools the fluid output from the compressor using an auto-cascade system as described for FIG. 1. The cooled fluid is sent towards outputs connected to each conditioning circuit 20. The warmer gas from the compressor is also directed towards these outputs.

Temperature control may be provided by temperature control circuitry 30 that receives information from the semiconductor processing control circuitry indicating the temperature required for each chamber and thus, each conditioning circuit. Temperature control circuitry 30 controls valves 26a and 26b in each warm gas line and valves 27a and 27b in the refrigeration lines to give a controlled flow of warmer and cooler fluids and provide the required temperature at the conditioning circuit. Thus, if one or more of the conditioning circuits is to be warmed one or both of valves 27a or 27b from the refrigeration system are closed and one or more of valves 26a or 26b are opened allowing warm gas from the compressor into the respective conditioning circuit to warm the wafer. It may be that the two chambers are at different points in the cycle and one is warmed while the other is cooled and this can be done by control of the valves.

Further temperature control may be provided by mixing the two flows by opening each of the valves 26, 27 by a certain amount or for a certain time. In this case temperature sensors 32a and 32b provide signals to the temperature control circuitry allowing it to adjust the flows as required.

In other embodiments, more varied or precise temperature control is provided by other means such as by control of an expansion device or control of the compressors, or control of the flow rate using a proportional flow control valve.

The refrigeration system described above uses a mixed refrigerant comprising a number of different refrigerants. The refrigerant blend can contain individual components that belong to one or more of the following categories- organic compounds, inorganic compounds, unsaturated organic compounds, zeotropic mixtures, azeotropic mixtures, natural refrigerants (N2, NH3, methane, ethane, CO2 etc.), inert gases (Argon, Neon etc.).

The refrigerant is used as the conditioning fluid in the conditioning circuits such that the semiconductor wafer chuck is directly conditioned using the refrigerant blend as the conditioning fluid. The refrigerant blend at the coldest point of the refrigeration system typically consists of 2-5 constituents. It is proposed that the refrigerant blend be introduced into the conditioning circuits inside the processing apparatus, such as within the semiconductor chucks. The chuck is thus directly coupled to the refrigeration system. This arrangement allows the working fluid (refrigerant mixtures) to absorb heat from or in a heating cycle provide heat to the wafer chuck in an efficient manner. This results in heat transfer efficiencies that are at least an order of magnitude higher than those obtained by using a secondary heat transfer fluid.

In a duty cycle (operational mode) when heat is to be extracted from the wafer, the refrigerant mixture can utilize the sensible as well as latent modes of heat removal. The latent heat capacity of fluids is orders of magnitude higher than the sensible heat capacity. However, for the latent heat capacity to come into play, phase change (liquid to vapor) of the working fluid needs to happen. In embodiments, the multi-component refrigerant mixture is in a mixed phase (liquid-vapor mixture) as it enters the conditioning circuit. When exposed to the heat from the chuck the liquid phase constituents of the mixture evaporate absorbing latent heat while the vapor phase constituents absorbs sensible heat from the wafer. When a fluid changes phase at a constant pressure, its temperature also remains constant. This thermodynamic property is exploited in this invention to absorb heat a uniform temperature. As the latent heat capacity is much greater than the sensible heat capacity, the bulk of the heat is absorbed by the constituents that are undergoing phase transformation. This in turn means that the temperature inside the conditioning circuit remains substantially constant, which is an important requirement for any semiconductor processing application.

Another important advantage of embodiments is the ability to have multiple independent wafer conditioning circuits that can condition multiple chucks and in some embodiments wafer chucks simultaneously. This is depicted in FIGS. 2 and 3.

Heating of the wafer chuck: The refrigerant flowing into the wafer chuck can be heated to the required setpoint temperature by the means of electric heaters or via heat exchange with the hot discharge from the compressor or via heat exchange with hot refrigerant from an intermediate part of the system or hot refrigerant at compressor discharge can be directly circulated through the semiconductor chuck. Each of the above means can be used independently or in tandem to get to the required heating capacity and temperature.

It should be noted that the temperature control apparatus of embodiments provides temperature control by controlling a temperature of a conditioning fluid sent to a conditioning circuit used to heat or cool a wafer. The conditioning circuit may be located in the wafer support, which may be a chuck or a cold plate.

Temperature control is provided by embodiments of the invention by using temperature control circuitry which controls components within the refrigeration system to change the cooling provided by the refrigerant output to the conditioning circuit, by either changing its phase composition, its pressure, its mass flow rate or its temperature. The following designs can be used independently or in tandem:
1. Controlling the mass flow rate of cold refrigerant entering the wafer chuck by means of a ON/OFF valve. This valve can be pneumatically or electrically actuated. One example can be a fast cycle solenoid valve.
2. Controlling the mass flow rate cold refrigerant entering the wafer chuck by the means of a proportional control valve. One example can be a servo or stepper motor actuated valve.
3. Controlling the expansion of the saturated liquid stream before it enters the semiconductor wafer chuck by the means of an expansion device. This device can be one or more capillary tubes, thermostatic expansion valve, electronic expansion valve or a combination of these options 4. Adding heat to the cold refrigerant before it enters the wafer chuck by means of a heat exchanger. This heat exchanger (single pass/multi pass, single channel/multi-channel) can have 1 or multiple streams of fluid (at warmer temperatures) that can exchange heat with the cold refrigerant. Flow rate of all the fluids through the heat exchanger can be controlled using ON/OFF cycling or proportional flow control valves.

5. Adding heat to the cold refrigerant before it enters the wafer chuck by means of a heat exchanger. This heat exchanger (single pass/multi pass, single channel/multi-channel) can have water or any other available process fluid (not a part of the cryo-chiller) at a warmer temperature that can exchange heat with the cold refrigerant. Flow rate of all the fluids through the heat exchanger can be controlled using ON/OFF cycling or proportional flow control valves 6. By mixing a controlled amount of warm refrigerant from another part of the refrigeration system with the cold refrigerant stream to obtain a mixture at the target temperature. The mass flow rate of the fluids can be controlled via ON/OFF cycling or proportional flow control valves.

7. By changing the composition of the mixed refrigerant stream entering the wafer chuck. This can be done by changing the operational parameters (Temperature and Pressure) of the refrigeration system's 'stack'. Stack parameters can be changed by controlling the flow rate of liquid refrigerants coming out of one or multiple phase separators. This can be done by the means of flow control/pressure reducing devices (Items 11, 12) such as ON/OFF valves, proportional control valves, Thermostatic Expansion valves, Electronic Expansion valves etc.

8. By altering the discharge mass flow rate of the compressor. This can be done by the means of compressor unloaders, variable speed compressors etc.

9. In the case that a compressor skid (multiple compressors in parallel operation) is being used. By altering the overall discharge mass flow rate of compressor skid by turning individual compressor/s ON/OFF or using a VFD to slow down individual compressor/s or by unloading individual compressor/s as required.

10. By diverting a portion of the compressor discharge mass flow such that it is recirculated back to the compressor without having gone through the rest of the refrigeration system. Essentially short-circuiting a portion of the refrigerant mass flow. This can be done by the means of a discharge pressure control valves, hot gas bypass valves, ON/OFF solenoid/pneumatic flow control valves, proportional flow control valves etc.

11. By the use of an EPR (Evaporator Pressure Regulator) valve to control the saturation pressure of the refrigerant mixture at the semiconductor wafer chuck and thereby the temperature.

In embodiments the refrigeration system contains measurement/sensing devices (thermo-couples, pressure transducers, flow meters, current meters) prevalent in the semiconductor conditioning/processing industry for monitoring the pressure, temperature, flow rate, compressor current etc. These can be standard or custom type measurement devices. The number and type of these measurement devices may not be mentioned in detail because of the sheer variety of available options prevalent in the industry.

The readings from the measurement devices (Temperature, Pressure, Mass flow rate etc.) are recorded, stored and analysed by one or multiple controllers (standard or custom) inside the cryo-chiller. These controllers can be standard or custom micro-processor based controllers, PLC type controller, PID type controllers to name a few options. The controllers can be a combination of multiple types of controller options listed (but not limited to) above. The refrigeration system also has the ability to store data on system and/or process parameters, such as, but not limited to temperature, pressure, flow rates, current, power consumption etc. The refrigeration system is also capable of remote operation where the unit can be controlled by a remote operator/s or computer/s. The refrigeration system can communicate with other refrigeration systems, remote operators (human or computer) by the means of standard or custom protocols (Ethernet, Ethernet IP, USB etc. to name a few) that can be wired or wireless data connections.

In summary embodiments may provide the following advantages:

1. Large envelope of setpoint temperatures possible, −180 C to +150 C
2. Ability to condition semiconductor wafer chuck down to −180 C temperature with high cooling capacity (several kW range) and high energy efficiency
3. Significantly higher heat transfer efficiency at the wafer chuck compared to present day semiconductor chillers
4. Ability to capitalize on the high latent heat capacity of refrigerants to remove heat from semiconductor wafer chuck
5. Significantly higher overall energy efficiency (kW/kW of cooling capacity) compared to present day semiconductor chillers
6. Ability for temperature control of semiconductor wafer chuck at user settable temperature in the −180 C to +150 C range
7. Order of magnitude higher foot-print efficiency (kW cooling capacity/unit area of refrigeration system) than present day semiconductor chillers
8. Eliminates the need for a secondary heat transfer fluid and associated cost, space and maintenance requirements
9. Eliminates inherent inefficiencies associated with multiple heat transfer steps between fluids
10. Much faster start-up times because there no need to cool/heat a large volume of fluid before the system can begin operation
11. Low thermal inertia and much faster response time to changes in temperature set-point or operational modes (Cooling, heating)
12. Ability to condition multiple semiconductor wafer chucks simultaneously because of multiple cooling/heating circuits available
13. Lower probability for leaks due to absence of heat transfer fluid In summary, embodiments comprise a mixed refrigerant refrigeration system that comprises a closed loop temperature control apparatus that works on the Auto-cascade thermodynamic cycle. The working fluid in this kind of system is a mixture (blend) of refrigerants. Each constituent of the refrigerant blend is selected based on its properties (thermo-physical and electrical) including but not limited to saturation temperature, specific heat, conductivity, dielectric strength, miscibility with other refrigerants etc.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A temperature control apparatus for supplying fluid to control a temperature of at least one semiconductor wafer within a semiconductor processing chamber, said temperature control apparatus comprising:
a mixed refrigerant refrigeration system;
said temperature control apparatus being configured to supply said mixed refrigerant to at least one conditioning circuit within said semiconductor processing chamber and to receive said mixed refrigerant from said at least one conditioning circuit; wherein
said temperature control apparatus comprises temperature control circuitry for controlling a temperature of said at least one conditioning circuit to one of a plurality of predetermined temperatures, at least one of said temperatures being below −100° C.;
said temperature control circuitry being configured to receive a signal indicative of a temperature of said at least one conditioning circuit from at least one temperature sensor and to control said temperature of said at least one conditioning circuit in dependence upon said received signal and said predetermined temperature by controlling a composition of said mixed refrigerant supplied to said at least one conditioning circuit by altering a mass flow rate of liquid phase refrigerants leaving a phase separator to change said temperature of said at least one conditioning circuit.

2. The temperature control apparatus according to claim 1, wherein said temperature control apparatus comprises:
said at least one temperature sensor.

3. The temperature control apparatus according to claim 1, wherein said apparatus is configured to supply said mixed refrigerant to a plurality of conditioning circuits for cooling or conditioning a plurality of semiconductor wafer, said plurality of conditioning circuits being arranged in parallel with each other,
said temperature control apparatus being configured to control circulation of said mixed refrigerant through selected ones of said plurality of conditioning circuits during a processing cycle.

4. The temperature control apparatus according to claim 3, wherein said temperature control circuitry is configured to individually control a temperature of said plurality of conditioning circuits by controlling at least one of a mass flow rate, temperature or composition of said mixed refrigerant supplied to each of said plurality of conditioning circuits.

5. The temperature control apparatus according to claim 4, wherein said temperature control circuitry is configured to receive signals indicative of a temperature of each said plurality of conditioning circuits from a plurality of temperature sensors and to control said temperature of said plurality of conditioning circuits in dependence upon said received signals and said predetermined temperatures by controlling at least one of a mass flow rate, composition or temperature of said mixed refrigerant supplied to each of said plurality of conditioning circuits.

6. The temperature control apparatus according to claim 3 comprising:
a bypass mixed refrigerant channel for channeling a portion of said mixed refrigerant output from a compressor around at least a portion of said refrigeration system such that mixed refrigerant in said bypass mixed refrigerant channel is warmer than mixed refrigerant output by said refrigeration system; wherein
said temperature control circuitry is configured to control a temperature of said mixed refrigerant output to each of said selected ones of said plurality of conditioning circuits by controlling a supply at least one of said mixed refrigerant from said bypass channel and said mixed refrigerant output from said refrigeration system to said at least one wafer conditioning circuit.

7. The temperature control apparatus according to claim 1, wherein said temperature control apparatus comprises:
at least one valve for controlling a flow of refrigerant into said at least one conditioning circuit.

8. The temperature control apparatus according to claim 7, wherein said at least one valve comprises at least one of: an on/off valve and a proportional flow control valve.

9. The temperature control apparatus according to claim 1, wherein said temperature control apparatus comprises:
a heat exchanger through which at least a portion of said mixed refrigerant flows, said heat exchanger being configured to receive a controlled flow of at least one warmer fluid from another portion of said refrigerant system.

10. The temperature control apparatus according to claim 1, wherein said temperature control apparatus comprises:
an expansion device for controlling an expansion of said mixed refrigerant and thus, a pressure and temperature of said mixed refrigerant within said at least one conditioning circuit.

11. The temperature control apparatus according to claim 1, wherein said refrigeration system comprises at least one compressor, said temperature control circuitry comprising control circuitry for controlling a discharge mass flow rate of said at least one compressor.

12. The temperature control apparatus according to claim 11, wherein said refrigeration system comprises a plurality of compressors arranged in parallel, said temperature control circuitry comprising control circuitry for controlling a discharge mass flow rate of said plurality of compressors by controlling at least one of:
a number of said plurality of compressors that are operational;
a control speed of at least one of said plurality of compressors; and
unloading at least one of said plurality of compressors.

13. An apparatus comprising a semiconductor processing chamber comprising at least one conditioning circuit, and a temperature control apparatus according to claim 1, said temperature control apparatus being arranged such that mixed refrigerant from said temperature control apparatus is supplied to said at least one conditioning circuit.

14. A method of controlling a temperature of at least one semiconductor wafer within a semiconductor processing chamber by controlling a temperature of at least one conditioning circuit within said semiconductor processing chamber to one of a plurality of predetermined temperatures, at least one of said temperatures being below −100° C.; said method comprising:
supplying a mixed refrigerant from a refrigeration system to said at least one conditioning circuit within said semiconductor processing chamber;
receiving said mixed refrigerant from said at least one conditioning circuit; and
receiving a signal indicative of a temperature of said at least one conditioning circuit from at least one temperature sensor and in dependence upon said received signal and said predetermined temperature controlling said temperature by controlling a composition of said mixed refrigerant supplied to said at least one conditioning circuit by altering a mass flow rate of liquid phase refrigerants leaving a phase separator to change said temperature of said at least one conditioning circuit.

\* \* \* \* \*